United States Patent
Kuiper

(10) Patent No.: US 10,802,902 B2
(45) Date of Patent: Oct. 13, 2020

(54) NOTIFICATION OF CONTROLLER FAULT USING MESSAGE AUTHENTICATION CODE

(71) Applicant: GM Global Technology Operations LLC, Detroit, MI (US)

(72) Inventor: Jacob A. Kuiper, New Hudson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 16/168,121

(22) Filed: Oct. 23, 2018

(65) Prior Publication Data

US 2020/0125440 A1    Apr. 23, 2020

(51) Int. Cl.
*G06F 11/00* (2006.01)
*G06F 11/07* (2006.01)
*G06F 21/44* (2013.01)

(52) U.S. Cl.
CPC ...... *G06F 11/0772* (2013.01); *G06F 11/0739* (2013.01); *G06F 11/0751* (2013.01); *G06F 21/44* (2013.01); *G06F 21/445* (2013.01)

(58) Field of Classification Search
CPC ............. G06F 11/0739; G06F 11/0772; G06F 11/0751; G06F 21/44; G06F 13/4282; G06F 21/445
See application file for complete search history.

(56) References Cited

U.S. PATENT DOCUMENTS

| | | | | |
|---|---|---|---|---|
| 6,064,297 | A * | 5/2000 | Odinak | H04L 63/065 340/12.33 |
| 6,348,875 | B1 * | 2/2002 | Odinak | H04L 9/085 340/310.11 |
| 9,438,581 | B2 * | 9/2016 | Nairn | H04L 63/08 |
| 9,705,678 | B1 * | 7/2017 | Wang | G06F 21/44 |
| 9,725,073 | B2 * | 8/2017 | Haga | H04L 9/0891 |
| 9,902,370 | B2 * | 2/2018 | Haga | H04L 9/3242 |
| 10,211,990 | B2 * | 2/2019 | Nairn | H04L 9/3242 |
| 10,355,868 | B2 * | 7/2019 | Cho | H04L 9/0825 |
| 2004/0111608 | A1 * | 6/2004 | Oom Temudo de Castro | G06F 16/182 713/156 |
| 2013/0111582 | A1 * | 5/2013 | Forest | G06F 21/44 726/19 |
| 2015/0220755 | A1 * | 8/2015 | Mayer | G06F 21/606 726/30 |

(Continued)

*Primary Examiner* — Jonathan D Gibson
(74) *Attorney, Agent, or Firm* — Cantor Colburn LLP

(57) ABSTRACT

A system and method to provide notification of a controller fault in a multi-controller system using a message authentication code (MAC) involve receiving, at a security peripheral, a fault notification from a monitor of a first controller of the multi-controller system indicating that the first controller is faulty. The method also includes receiving, at the security peripheral, a key index from the first, and providing, from the security peripheral, a faulty MAC to the first controller based on the fault notification. The faulty MAC is different than the first correct MAC indicated by the key index from the first controller. A second controller among the controllers of multi-controller system receives a message from the first controller that includes the faulty MAC. The second controller determines that the message from the first controller cannot be trusted based on the faulty MAC not matching the first correct MAC.

20 Claims, 3 Drawing Sheets

(56) References Cited

U.S. PATENT DOCUMENTS

| | | | |
|---|---|---|---|
| 2015/0295910 A1* | 10/2015 | Nairn | H04L 63/08 |
| | | | 726/7 |
| 2016/0026787 A1* | 1/2016 | Nairn | G06F 13/4282 |
| | | | 726/17 |
| 2016/0297401 A1* | 10/2016 | Haga | H04L 9/0891 |
| 2016/0330032 A1* | 11/2016 | Naim | G06F 13/4282 |
| 2017/0013006 A1* | 1/2017 | Ujiie | H04L 12/6418 |
| 2017/0109521 A1* | 4/2017 | Ujiie | G06F 21/44 |
| 2017/0361808 A1* | 12/2017 | Haga | A61P 9/00 |
| 2019/0080096 A1* | 3/2019 | Savry | G06F 21/44 |
| 2019/0207950 A1* | 7/2019 | Mohammed | G06F 21/606 |
| 2019/0275891 A1* | 9/2019 | Shidai | G07C 5/0841 |

\* cited by examiner

NOTIFICATION OF CONTROLLER FAULT USING MESSAGE AUTHENTICATION CODE

INTRODUCTION

The subject disclosure relates to the notification of a controller fault using a message authentication code (MAC).

Multi-controller systems distribute functionality across multiple controllers that communicate with each other. A vehicle (e.g., automobile, truck, farm equipment, construction equipment, automated manufacturing tool) is an example of a multi-controller system. Communication among the multiple controllers facilitates proper operation of the complete multi-controller system. When one of the controllers experiences a fault, operation of the multi-controller system can be negatively affected. Accordingly, it is desirable to provide notification of a controller fault using a MAC.

SUMMARY

In one exemplary embodiment, a method of providing notification of a controller fault in a multi-controller system using a message authentication code (MAC) includes receiving, at a first security peripheral, a fault notification from a monitor that monitors a first controller among controllers of the multi-controller system. The fault notification indicates that the first controller is faulty. The method also includes receiving, at the first security peripheral, a key index from the first controller as a request for a first correct MAC, and providing, from the first security peripheral, a faulty MAC to the first controller based on the fault notification. The faulty MAC is different than the first correct MAC indicated by the key index from the first controller. A second controller among the controllers of multi-controller system receives a message from the first controller. The message includes the faulty MAC. The second controller determines that the message from the first controller cannot be trusted based on the faulty MAC not matching the first correct MAC expected by the second controller.

In addition to one or more of the features described herein, the method also including requesting, by the second controller from a second security peripheral, a second correct MAC after receiving the message from the faulty controller. The second correct MAC is a same MAC as the first correct MAC.

In addition to one or more of the features described herein, the method also including obtaining the second correct MAC from the second security peripheral at the second controller.

In addition to one or more of the features described herein, the method also including comparing, at the second controller, the faulty MAC in the message from the first controller with the second correct MAC.

In addition to one or more of the features described herein, the method also including requesting, by the second controller from the second security peripheral, a safety mode MAC after the determining that the message from the first controller cannot be trusted.

In addition to one or more of the features described herein, the method also including receiving, at the second controller, the safety mode MAC from the second security peripheral.

In addition to one or more of the features described herein, the method also including comparing, at the second controller, the faulty MAC in the message from the first controller with the safety mode MAC.

In addition to one or more of the features described herein, the method also including the second controller issuing fault codes to a central controller, based on the faulty MAC matching the safety mode MAC, to notify the central controller that the first controller is faulty.

In addition to one or more of the features described herein, the method also including the first controller issuing regular health messages to the monitor prior to the first controller becoming faulty.

In addition to one or more of the features described herein, the method also including the monitor issuing the fault notification to the first security peripheral after the first controller stops issuing the regular health messages to the monitor.

In another exemplary embodiment, a multi-controller system includes a first controller among controllers of the multi-controller system, and a monitor to receive regular health messages from the first controller and to issue a fault notification after the first controller stops issuing the regular health messages to the monitor. A first security peripheral receives the fault notification from the monitor. The fault notification indicates that the first controller is faulty. The first security peripheral also receives a key index from the first controller as a request for a first correct MAC, and provides a faulty MAC to the first controller based on the fault notification. The faulty MAC is different than the first correct MAC requested by the first controller. A second controller among the controllers of multi-controller system receives a message from the first controller that includes the faulty MAC and determines that the message from the first controller cannot be trusted based on the faulty MAC not matching the first correct MAC expected by the second controller.

In addition to one or more of the features described herein, the system also includes a second security peripheral. The second controller requests, from the second security peripheral, a second correct MAC after receiving the message from the faulty controller. The second correct MAC is a same MAC as the first correct MAC.

In addition to one or more of the features described herein, the second controller receives the second correct MAC from the second security peripheral.

In addition to one or more of the features described herein, the second controller compares the faulty MAC in the message from the first controller with the second correct MAC.

In addition to one or more of the features described herein, the second controller requests, from the second security peripheral, a safety mode MAC after the determining that the message from the first controller cannot be trusted.

In addition to one or more of the features described herein, the second controller receives the safety mode MAC from the second security peripheral.

In addition to one or more of the features described herein, the second controller compares the faulty MAC in the message from the first controller with the safety mode MAC.

In addition to one or more of the features described herein, the second controller issues fault codes to a central controller, based on the faulty MAC matching the safety mode MAC, to notify the central controller that the first controller is faulty.

In addition to one or more of the features described herein, the multi-controller system is part of a vehicle.

In addition to one or more of the features described herein, one or more operations of the vehicle are controlled based on communication among the controllers of the multi-controller system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
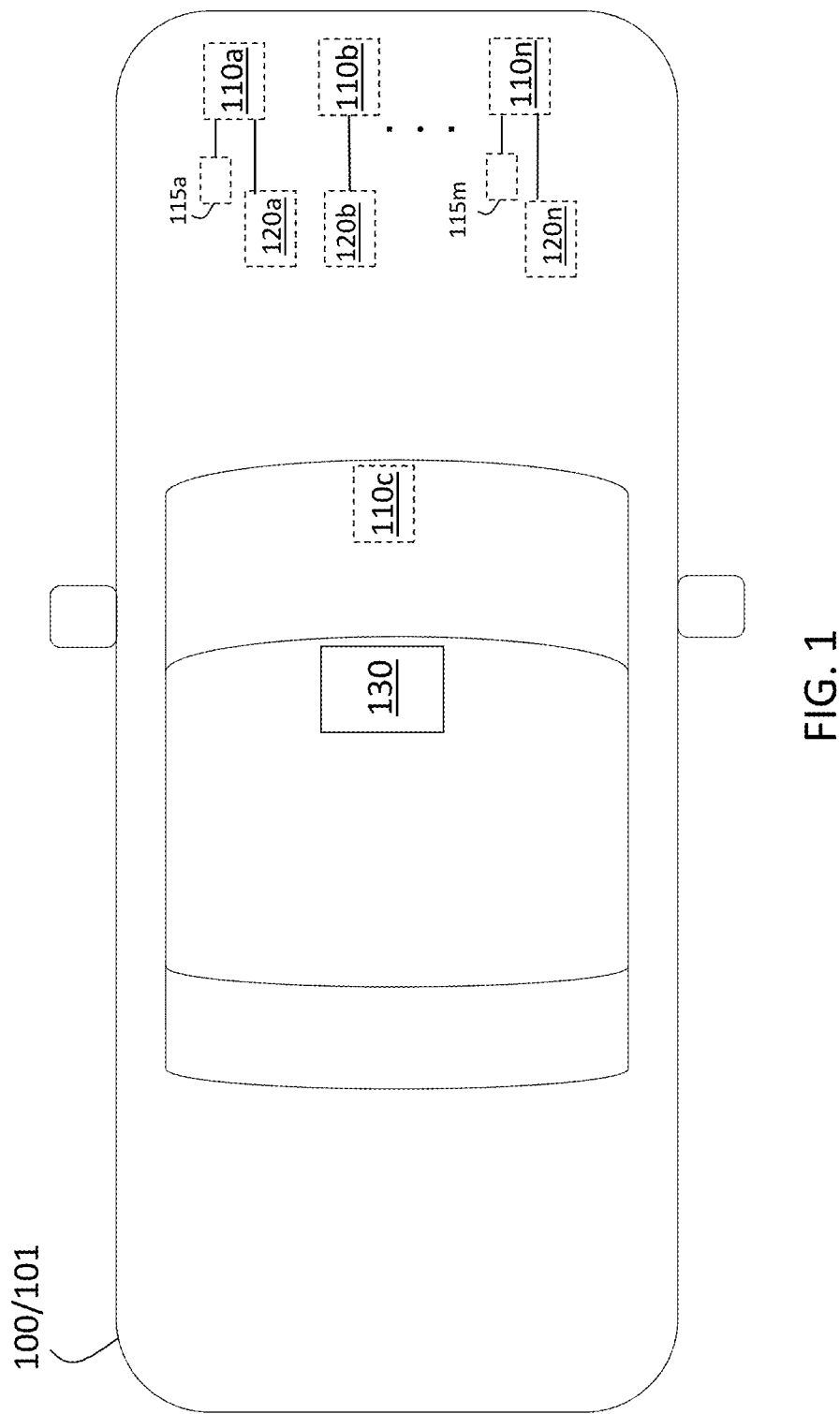
FIG. 1 shows a block diagram of relevant aspects of a vehicle that involve notification of a controller fault using a message authentication code (MAC)

The following description is merely exemplary in nature and is not intended to limit the present disclosure, its application or uses. It should be understood that throughout the drawings, corresponding reference numerals indicate like or corresponding parts and features.

As previously noted, a multi-controller system, like a vehicle, typically requires communication among the controllers for proper operation. When one of the controllers experiences a fault, the other controllers must be notified. This is because the faulty controller may provide incorrect data to other controllers that may lead to improper operation or even a hazard. A previous approach to fault detection involved a faulty controller stopping all communication as a sign of its improper operation. However, while the lack of communication alerts other controllers to the fault, it also prevents communication of diagnostic codes from the faulty controller or fixes to the faulty controller that may facilitate diagnosis or correction of controller operation.

Embodiments of the systems and methods detailed herein relate to notification of a controller fault using a MAC when the faulty controller performs encoded communication. For example, a vehicle includes a security peripheral to allow authenticated communication by controllers associated with certain functionality that may be critical to safety (e.g., engine control, brake control). The arithmetic logic unit (ALU) of the security peripheral generates a MAC that is included with the communication. As detailed, this MAC can be used to indicate a fault such that a faulty controller need not stop all communication. Recognition of the fault-indicating MAC by other controllers facilitates the potential for targeted run-time reaction by the other controllers, as well as diagnosis and repair of the fault.

In accordance with an exemplary embodiment, FIG. 1 shows a block diagram of relevant aspects of a vehicle 100 that involve notification of a controller fault using a MAC, which is a digital signature. The exemplary vehicle 100 shown in FIG. 1 is an automobile 101. The vehicle 100 is shown with several controllers 110a through 110n (generally referred to as 110), which can also be referred to as electronic control units (ECUs). Each controller 110 may be associated with a security peripheral 120, as shown. According to an alternate embodiment, the controllers 110 may communicate with a single security peripheral 120. Each security peripheral 120 includes an ALU 210 (FIG. 2) and other components to provide authentication codes (i.e., MACs), as further discussed with reference to FIG. 2. The vehicle can also include sensors 130 (e.g., cameras, radar systems, lidar systems) that communicate with one or more controllers 110. Some of the controllers 110 are shown with corresponding monitors 115a to 115m (generally referred to as 115). While only the connection between a given controller 110 and the corresponding monitor 115 is shown in FIG. 1 for simplicity, any of the components shown for the vehicle 101 may communicate using wires or wirelessly. Additionally, the locations for the components shown in FIG. 1 are only exemplary, and the controllers 110 or sensors 130 could be located in various different locations of the automobile 101 according to alternate embodiments.

Each controller 110 of the automobile 101 may be categorized according to an automotive safety integrity level (ASIL). For example, an engine controller 110 or a brake controller 110 may be high ASIL systems, because they affect the safety of the operation of the vehicle 101. On the other hand, an infotainment controller 110 may be a low ASIL system or have no ASIL level at all. A window controller 110 may be regarded as a medium ASIL system. Generally, higher ASIL systems are associated with more fault detection by way of a monitor 115 or other system. In the exemplary vehicle 101 shown in FIG. 1, each monitor 115 performs fault detection and reaction for the corresponding controller 110. For example, monitor 115a performs fault detection and reaction for controller 110a.

Figure 2:
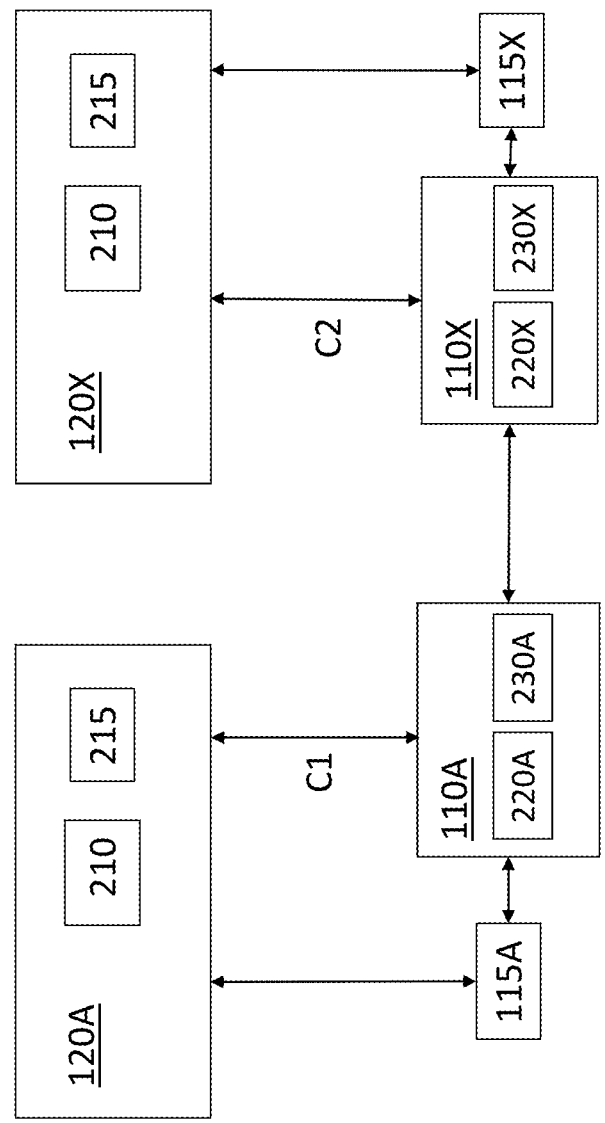
FIG. 2 is a block diagram used to explain notification of a controller fault using a MAC according to one or more embodiments.

FIG. 2 is a block diagram used to explain notification of a controller fault using a MAC according to one or more embodiments. Two controllers 110A and 110X are shown. Each controller 110A and 110X is coupled to a corresponding monitor 115A and 115X and a corresponding security peripheral 120A and 120X. Each controller 110A, 110X includes processing circuitry that may include an application specific integrated circuit (ASIC), an electronic circuit, a processor 220A, 220X (generally referred to as 220) (shared, dedicated, or group) and memory 230A, 230X (generally referred to as 230) that executes one or more software or firmware programs, a combinational logic circuit, and/or other suitable components that provide the described functionality. The security peripherals 120A, 120X include the ALU 210 that generates MACs. The security peripherals 120A, 120X include processing circuitry like the controllers 110. The ALU 210 can be additional to or part of another processor of the processing circuitry, which may also include memory 215. A controller 110 and corresponding security peripheral 120 may be part of the same integrated circuit (i.e., chip) and may be on the same printed circuit board (PCB) as the corresponding monitor 115.

Assuming, for explanatory purposes, that controller 110A is sending communication to controller 110X, the controller 110A selects a key stored in the security peripheral 120A by sending a corresponding key index and the data to be sent with authentication to the security peripheral 120A. The controller 110A is then provided with a signature, a MAC C1, from the security peripheral 120A. The controller 110A then sends a message with the data and MAC C1 to the controller 110X. When the controller 110X receives the communication from controller 110A, it sends a key index corresponding with the data in the message and the data to the security peripheral 120X to obtain MAC C2. The controller 110X compares MAC C1, which was received in the communication from controller 110A, with MAC C2, which was obtained from the security peripheral 120. If MAC C1 and MAC C2 are the same, then the data in the message from the controller 110A is authenticated, and the controller 110X knows that it can trust the data communicated from controller 110A.

According to one or more embodiments, the monitor 115A obtains regular (e.g., periodic) communication from the controller 110A. When the controller 110A has a fault, it terminates communication with the monitor 115A. Unlike existing systems, according to one or more embodiments, the controller 110A only ceases communication with the corresponding monitor 115A when it detects a fault but continues other communication such as, for example, with controller 110X. When the controller 110A ceases communication with the corresponding monitor 115A, the monitor 115A, in turn, notifies the security peripheral 120A about the fault in controller 110A. This results in the security peripheral 120A (specifically, the ALU 210A) using a predefined key, different from the key corresponding with the key index from the controller 110A, and providing a faulty MAC C1' (FIG. 3) to controller 110A. When controller 110X subsequently receives communication from controller 110A with the faulty MAC C1', it finds that MAC C2 does not match the faulty MAC C1' that was communicated by controller 110A. This indicates a fault in the message received from controller 110A to controller 110X. One reaction of the controller 110X to learning of a fault in controller 110A is to no longer use the data in the message from the controller 110A.

According to an additional or alternate embodiment, when the security peripheral 120A obtains information from the monitor 115A that there is a fault in controller 110A, the security peripheral 120A provides a safety mode MAC C1' rather than just any faulty MAC. The safety mode MAC C1', which is generated by the security peripheral 120A using the predefined key that is different from the key corresponding with the key index from the controller 110A, is a specific predefined MAC rather than just a MAC C1 with an error introduced in it, for example. Upon receiving the communication from the controller 110A with the MAC C1', after determining that MAC C1' does not match MAC C2, the controller 110X can provide a key index associated with a safety key to the security peripheral 120X to obtain a safety mode MAC C2'. The controller 110X can then compare the safety mode MAC C1' received from controller 110A with the safety mode MAC C2'. If there is a match, then the controller 110X verifies that there is a fault in controller 110A rather than a data corruption issue, for example. Controller 110X can then send trouble codes to indicate the fault in controller 110A to a central controller 110, for example. The central controller 110 can be any of the controllers 110 or an additional controller 110 that performs management functions for the other controllers 110. The fault indication to the central controller 110 can result in diagnosis and fixes to the controller 110A.

Figure 3:
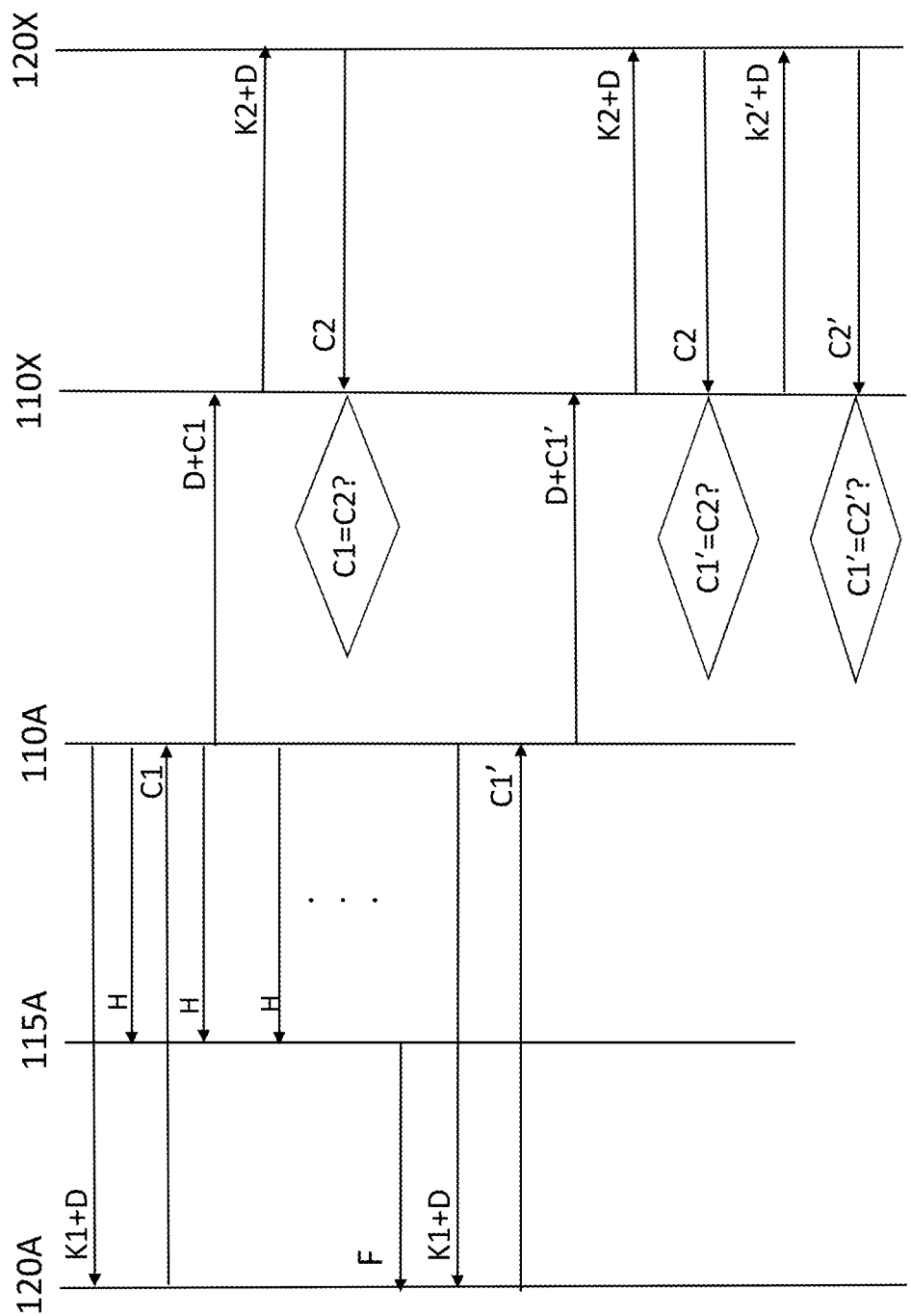
FIG. 3 shows a message flow involved in performing notification of a controller fault using a MAC according to one or more embodiments.

FIG. 3 shows a message flow involved in performing notification of a controller fault using a MAC according to one or more embodiments. The controller 110A sends a key index k1 along with data D to the security peripheral 120A and the security peripheral 120A sends back MAC C1 to the controller 110A. Upon receiving MAC C1 from the security peripheral 120A, the controller 110A sends data D and the MAC C1 to controller 110X. Upon receiving the message with the data D and MAC C1, the controller 110X sends a key index k2 and the data D to the security peripheral 120X and obtains MAC C2 from the security peripheral 120X. The controller 110X compares MAC C1 and MAC C2 to determine if they are the same. If they are, the controller 110X can trust the data D and use it as needed.

As FIG. 3 indicates, the controller 110A also sends health messages H to a corresponding monitor 115A periodically. When a fault occurs in the controller 110A, the health messages H to the monitor 115A are terminated. This causes the monitor 115A to send a fault indicator F to the security peripheral 120A. When the controller 110A, which has a fault, subsequently sends a key index k1 and data D as a MAC request to the security peripheral 120A, the security peripheral 120A, which has been informed of the fault by the monitor 115A, sends MAC C1'. According to an exemplary embodiment, MAC C1' is a faulty MAC C1 that is different than the MAC C1 that should be generated based on the key index k1. According to another exemplary embodiment, MAC C1' is not only different from the MAC C1 that should be generated based on the key index k1 but is also a specific predefined safety mode MAC. The controller 110A sends data D and MAC C1' to the controller 110X.

Upon receiving the message with the data D and MAC C1', the controller 110X sends a key index k2 and the data D to the security peripheral 120X and receives MAC C2, which is the expected code from the controller 110A. As FIG. 3 indicates, the controller 110X compares the received MAC C1' with MAC C2. According to an exemplary embodiment in which MAC C1' is a faulty MAC, the controller 110X may stop using the data D from the controller 110A. According to an additional or alternate embodiment, in which MAC C1' is a specific safety mode MAC in addition to being a faulty MAC (i.e., different from MAC C1), the controller 110X sends a safety mode key index k2' with the data D to the security peripheral 120X and receives a safety mode MAC C2'. If the controller 110X determines that MAC C1' and MAC C2' are the same, then controller 110X confirms that there is a fault in controller 110A. Based on this confirmation, the controller 110X can perform additional actions such as, for example, a transmission of error codes to a central controller 110.

The multi-controller system (e.g., vehicle 100) is improved by making fault identification among the controllers 110 more clear in comparison to, for example, simply having communication terminated. In addition, embodiments involving use of the safety mode MAC facilitate faster diagnosis and repair of faulty controllers 110. By ensuring that data generated by a faulty controller 110 is not used, system safety is maintained. In the case of the system being a vehicle 100 (e.g., automobile 101), the embodiments detailed herein ensure that vehicle operation (e.g., safety systems like collision avoidance, automated operation) that is controlled by data communicated among the controllers 110 is not compromised because of faulty data.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of providing notification of a controller fault in a multi-controller system using a message authentication code (MAC), the method comprising:

receiving, at a first security peripheral, a fault notification from a monitor that monitors a first controller among controllers of the multi-controller system, wherein the fault notification indicates that the first controller is faulty;

receiving, at the first security peripheral, a key index from the first controller as a request for a first correct MAC;

providing, from the first security peripheral, a faulty MAC to the first controller based on the fault notification, wherein the faulty MAC is different than the first correct MAC indicated by the key index from the first controller;

receiving, at a second controller among the controllers of the multi-controller system, a message from the first controller, wherein the message includes the faulty MAC;

determining, at the second controller, that the message from the first controller cannot be trusted based on the faulty MAC not matching the first correct MAC expected by the second controller.

2. The method according to claim 1, further comprising requesting, by the second controller from a second security peripheral, a second correct MAC after receiving the message from the faulty controller, wherein the second correct MAC is a same MAC as the first correct MAC.

3. The method according to claim 2, further comprising obtaining the second correct MAC from the second security peripheral at the second controller.

4. The method according to claim 3, further comprising comparing, at the second controller, the faulty MAC in the message from the first controller with the second correct MAC.

5. The method according to claim 1, further comprising requesting, by the second controller from a second security peripheral, a safety mode MAC after the determining that the message from the first controller cannot be trusted.

6. The method according to claim 5, further comprising receiving, at the second controller, the safety mode MAC from the second security peripheral.

7. The method according to claim 6, further comprising comparing, at the second controller, the faulty MAC in the message from the first controller with the safety mode MAC.

8. The method according to claim 7, further comprising the second controller issuing fault codes to a central controller, based on the faulty MAC matching the safety mode MAC, to notify the central controller that the first controller is faulty.

9. The method according to claim 1, further comprising the first controller issuing regular health messages to the monitor prior to the first controller becoming faulty.

10. The method according to claim 9, further comprising the monitor issuing the fault notification to the first security peripheral after the first controller stops issuing the regular health messages to the monitor.

11. A multi-controller system, the system comprising:
a first controller among controllers of the multi-controller system;
a monitor configured to receive regular health messages from the first controller and to issue a fault notification after the first controller stops issuing the regular health messages to the monitor;
a first security peripheral configured to receive the fault notification from the monitor, wherein the fault notification indicates that the first controller is faulty, to receive a key index from the first controller as a request for a first correct MAC, and to provide a faulty MAC to the first controller based on the fault notification, wherein the faulty MAC is different than the first correct MAC requested by the first controller; and
a second controller among the controllers of multi-controller system configured to receive a message from the first controller, wherein the message includes the faulty MAC, and to determine that the message from the first controller cannot be trusted based on the faulty MAC not matching the first correct MAC expected by the second controller.

12. The multi-controller system according to claim 11, further comprising a second security peripheral, wherein the second controller is configured to request, from the second security peripheral, a second correct MAC after receiving the message from the faulty controller, wherein the second correct MAC is a same MAC as the first correct MAC.

13. The multi-controller system according to claim 12, wherein the second controller receives the second correct MAC from the second security peripheral.

14. The multi-controller system according to claim 13, wherein the second controller is further configured to compare the faulty MAC in the message from the first controller with the second correct MAC.

15. The multi-controller system according to claim 11, wherein the second controller is further configured to request, from a second security peripheral, a safety mode MAC after the determining that the message from the first controller cannot be trusted.

16. The multi-controller system according to claim 15, wherein the second controller receives the safety mode MAC from the second security peripheral.

17. The multi-controller system according to claim 16, wherein the second controller is further configured to compare the faulty MAC in the message from the first controller with the safety mode MAC.

18. The multi-controller system according to claim 17, wherein the second controller is further configured to issue fault codes to a central controller, based on the faulty MAC matching the safety mode MAC, to notify the central controller that the first controller is faulty.

19. The multi-controller system according to claim 18, wherein the multi-controller system is part of a vehicle.

20. The multi-controller system according to claim 19, wherein one or more operations of the vehicle are controlled based on communication among the controllers of the multi-controller system.

* * * * *